J. G. SWANSON.
IMPLEMENT FOR CUTTING FRUIT.
APPLICATION FILED MAR. 21, 1916.

1,197,965.

Patented Sept. 12, 1916.
2 SHEETS—SHEET 1.

Witness
Edward Stokitt

Inventor
John G. Swanson
By Church & Church
his Attorneys

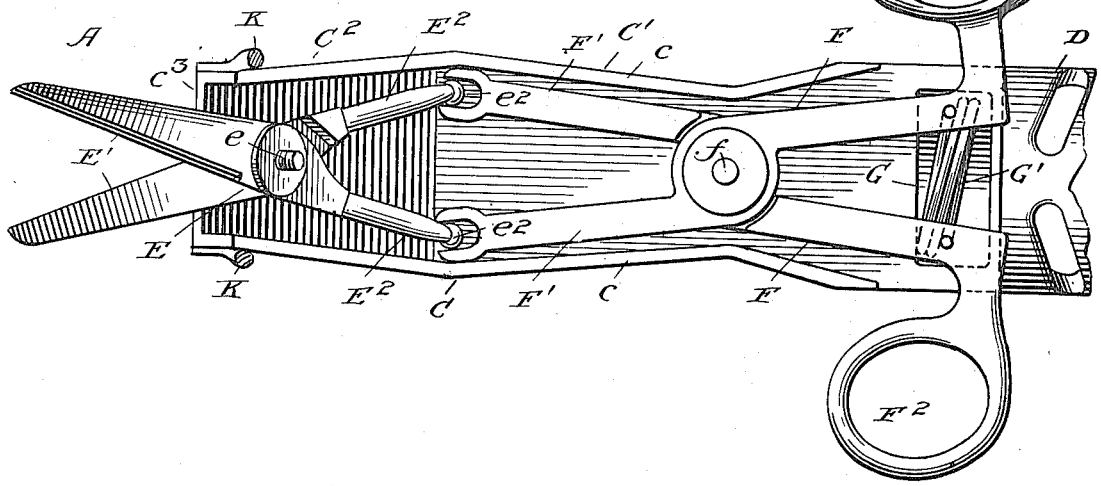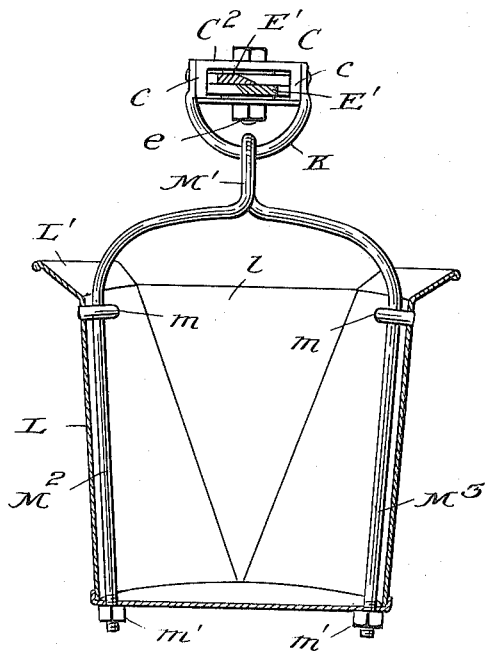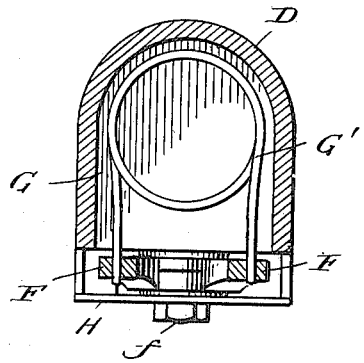

UNITED STATES PATENT OFFICE.

JOHN G. SWANSON, OF QUINCY, ILLINOIS.

IMPLEMENT FOR CUTTING FRUIT.

1,197,965.

Specification of Letters Patent.

Patented Sept. 12, 1916.

Application filed March 21, 1916. Serial No. 85,626.

*To all whom it may concern:*

Be it known that I, JOHN G. SWANSON, a citizen of the United States, residing at Quincy, in the county of Adams and State of Illinois, have invented certain new and useful Improvements in Implements for Cutting Fruit; and I do hereby declare the following to be a full, clear, and exact description of the same, reference being had to the accompanying drawings, forming part of this specification.

The object of this invention is to provide a simple, convenient and highly efficient implement for cutting fruit from the trees or bushes on which it grows, which will enable the operator to easily reach and cut fruit growing in places difficult of access, without injury to the fruit or small twigs and branches of the tree or bush.

A full understanding of the invention will be attained from the ensuing detailed description when taken in connection with the accompanying drawings which illustrate a structural embodiment of the invention in a preferred form. The novel features of the invention will be particularly pointed out and specified in the claims at the end of the specification.

Figure 1:
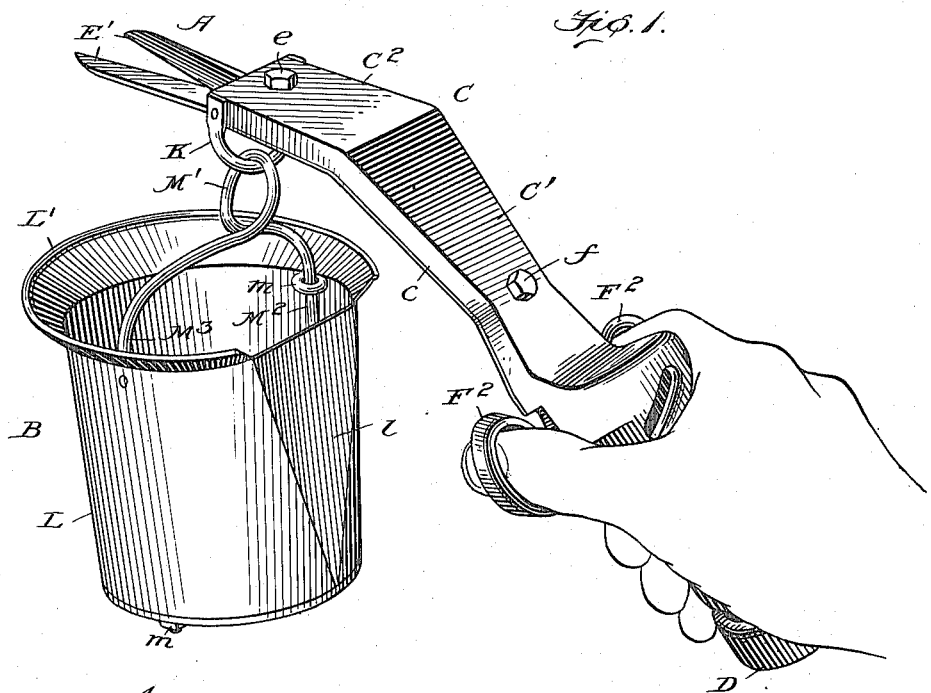
Figure 2:
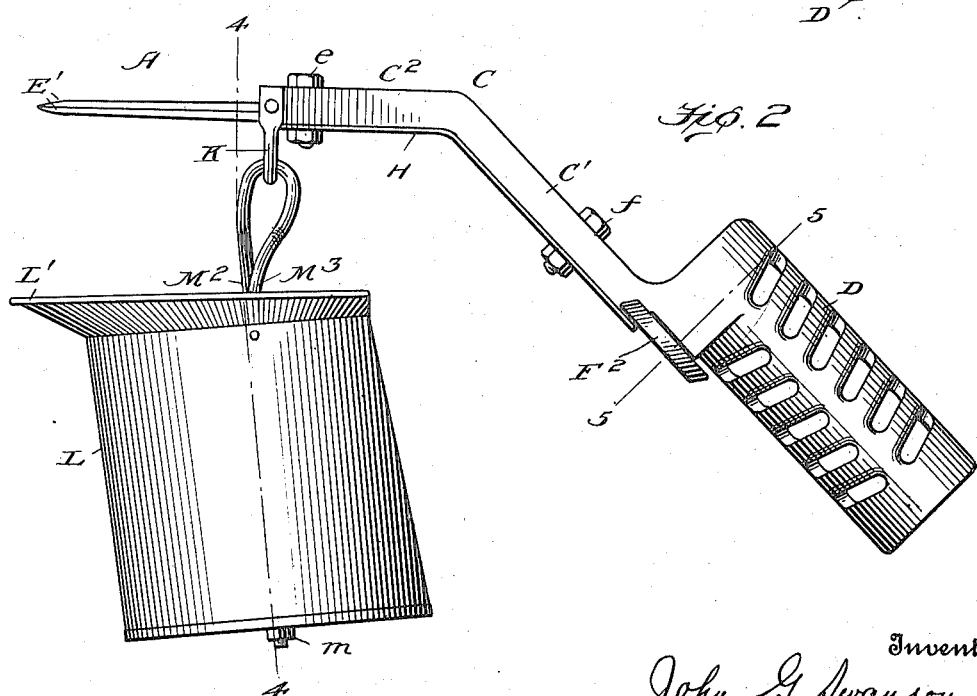

In the drawings,—Figure 1 is a perspective of the cutting shears and receptacle of an implement constructed in accordance with the present improvements. Fig. 2 is a side elevation of the same. Fig. 3 is a bottom plan view of the shears with the cover plate removed to show the interior of the shank and construction of the parts. Fig. 4 is a vertical section taken in a plane indicated by the line 4—4 of Fig. 2. Fig. 5 is a transverse section taken in a plane indicated by the line 5—5 of Fig. 2.

Like characters of reference in the several figures indicate the same parts.

As shown in the accompanying drawings, the implement comprises generally the fruit cutting shears A from which may be freely suspended the fruit receiving receptacle B. The shank of the shears is preferably formed of an elongated bar C of any suitable material bent midway its ends to provide a lower portion $C'$ and an upper portion $C^2$ inclined relatively to the lower portion $C'$. At the end of said lower portion $C'$ there is provided a handle D of any suitable construction, the handle, in the present instance being formed integral with the shank, permitting the handle and shank to be made in a single casting. Extending along the sides of the shank are depending flanges $c$, so that a pocket co-extensive with the shank is formed for the reception and support of the operating parts of the implement. Pivoted together by means of a bolt $e$ mounted in the upper portion $C'$ of the shank are the blade members E. The blades $E'$ of said members extend beyond the upper end $c^3$ of the shank in a plane substantially parallel with said upper portion $C'$ and the lower ends $E^2$ of the blade members are formed into stems, as shown, having at their lower extremities enlargements or lugs $e^2$, for a purpose which will hereinafter appear.

The operating means for the blade members consists of a pair of suitable operating levers F pivoted together by means of a bolt $f$ to the lower portion $C'$ of the shank. The upper extremities $F'$ of the operating levers are formed with recesses receiving the lugs $e^2$ at the lower extremities of the blade members E, so as to provide an operating connection between said levers F and blade members E, which, in the present instance, is located approximately at the bend separating the upper portion of the shank from the lower portion thereof. The lower extremities of the operating levers F are formed with suitable finger holds $F^2$, as clearly shown in the accompanying drawings. Adjacent the handle D, the shank is formed with a recess G receiving a spring $G'$, the ends of which spring are connected to the operating levers at their lower extremities, whereby the finger holds $F^2$ are normally forced apart. As a result of the action of the spring the upper ends of the operating levers will be forced apart so as to also force apart the lower ends of the blade members E, and keep apart the blades $E'$. On the other hand, when the finger holds $F^2$ are forced toward each other, the blades $E'$ will be forced toward each other to make a cutting stroke. If desired the parts mounted on the shank C may be inclosed by a plate H secured by means of the bolts $e$ and $f$ to the shank and with the edges of the plate resting on the flanges $c$. The plate H, however, will be co-extensive in length with the shank so as not to interfere with the movement of the blades $E'$.

The above described fruit cutting shears are exceedingly simple in construction, and the system of leverage employed affords the exercise of a maximum power in making the cutting stroke, so as to greatly add to the efficiency of the shears.

The receiving receptacle L may be of any preferred type to be freely suspended from the upper end $c^3$ of the shears, and in the present instance it consists of a bucket having a flared extension L' extending part way around the upper end of its wall, so as to catch and direct into the bucket fruit cut by the blades E' of the shears. The flare L' is cut away on the side of the bucket facing the shears so as to permit free movement of the shears relatively to the bucket and, if desired, the wall of the bucket may be flattened out, as shown at $l$, to further assist in obtaining said freedom of movement. A wire M is twisted to form a loop M' located centrally above the top of the bucket. The ends $M^2$ $M^3$ of said wire are passed through stationary guides $m$ projecting from the wall of the bucket into the interior thereof, and said ends $M^2$ $M^3$ extend through the bottom of the bucket to which they are secured by means of nuts $m'$. Depending from the upper end $c^3$ of the shank C of the shears is a loop K adapted to receive the loop M' of the bucket, which may be effected by removing the wire M from the bucket and passing the said wire through the loop K until said loop K is engaged by the loop M'. The wire M may then be fastened to the bucket by passing the ends $M^2$ $M^3$ through the guides $m$ and bottom of the bucket and screwing on the nuts $m'$. With the parts assembled, as above described, the bucket L is freely suspended from the upper end of the shank, the upper portion C' of said shank inclining toward and over the bucket and also the blades E', so that fruit cut by the blades will drop into the bucket. The manner of suspending the bucket from the shank of the shears permits the shears to be turned completely over or otherwise shifted, as desired, and at the same time the bucket will always swing beneath the blades E' in proper position to catch the fruit. It will thus be noted that a very great freedom of movement is permitted the shears, without in any manner disturbing the proper position of the bucket, so that fruit in places ordinarily difficult to reach can easily be cut and gathered.

What is claimed is:

1. Fruit cutting shears such as described, embodying an elongated stationary shank having a lower portion provided with a depending handle and an upper portion inclined relatively to said lower portion, a pair of blade members lying in a plane parallel with the upper inclined portion of the shank and pivoted together between their ends to the upper portion of the shank with the blades of said members extending beyond the upper end of the shank, a pair of operating levers lying in a plane parallel with the lower portion of the shank and pivoted together to the lower portion of said shank and with their upper ends in operative engagement with the lower ends of said blade members, and a spring for keeping the lower ends of the operating levers normally apart.

2. Fruit cutting shears such as described, embodying a shank having a lower portion provided with a depending handle and an upper portion inclined relatively to said lower portion, a pair of blade members pivoted together between their ends to the upper portion of the shank, with the blades of said members extending beyond the upper end of the shank, a pair of operating levers pivoted together to the lower portion of said shank and having their upper ends formed with recesses receiving the lower ends of said blade members, and a spring for keeping the lower ends of the operating levers normally apart.

3. Fruit cutting shears such as described, embodying, a shank having a depending handle, a pair of blade members pivoted together between their ends to the upper portion of said shank with the blades of said members extending beyond the upper end of the shank, a pair of operating levers pivoted together to the shank beneath the blade members, the upper ends of said levers in operative engagement with the lower ends of the blade members, a recess formed in said shank adjacent the handle thereof, and a spring received in said recess and connected with the lower ends of said operating levers to keep them normally apart.

JOHN G. SWANSON.